United States Patent
Wen et al.

(10) Patent No.: US 9,736,796 B2
(45) Date of Patent: Aug. 15, 2017

(54) METHOD AND APPARATUS FOR REPORTING POWER HEADROOM IN SUPPORT OF MULTIPLE LINK CONNECTIONS

(71) Applicant: Alcatel Lucent, Boulogne Billancourt (FR)

(72) Inventors: Pingping Wen, Shanghai (CN); Chandrika Worrall, Newbury (GB)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/781,793

(22) PCT Filed: Apr. 3, 2014

(86) PCT No.: PCT/IB2014/000796
§ 371 (c)(1),
(2) Date: Oct. 1, 2015

(87) PCT Pub. No.: WO2014/162204
PCT Pub. Date: Oct. 9, 2014

(65) Prior Publication Data
US 2016/0057712 A1  Feb. 25, 2016

(30) Foreign Application Priority Data
Apr. 3, 2013 (CN) .......................... 2013 1 0116901

(51) Int. Cl.
*H04W 52/36* (2009.01)
*H04W 52/40* (2009.01)
*H04W 52/24* (2009.01)

(52) U.S. Cl.
CPC ....... *H04W 52/365* (2013.01); *H04W 52/242* (2013.01); *H04W 52/40* (2013.01)

(58) Field of Classification Search
CPC .. H04W 52/242; H04W 52/365; H04W 52/40
See application file for complete search history.

(56) References Cited

U.S. PATENT DOCUMENTS

| 2011/0310760 | A1* | 12/2011 | Wu | H04W 72/0413 |
| | | | | 370/252 |
| 2012/0224535 | A1* | 9/2012 | Kim | H04W 52/367 |
| | | | | 370/328 |

(Continued)

FOREIGN PATENT DOCUMENTS

| CN | 102740346 A | 10/2012 |
| CN | 102932892 A | 2/2013 |

(Continued)

OTHER PUBLICATIONS

LG Electronics, "PHR operation for dual connectivity," 3rd Generation Partnership Project (3GPP), 3GPP TSG-RAN2 Meeting #85, R2-140742, pp. 1-3, XP050737853, Prague, Czech Republic, Feb. 10-14, 2014. Li.

(Continued)

*Primary Examiner* — Mohamed Kamara
(74) *Attorney, Agent, or Firm* — Fay Sharpe, LLP (57) ABSTRACT

Embodiments of the present invention provide a method for reporting power headroom in support of multiple link connections. The method comprises: receiving, by a user equipment, one or more configured power headroom report parameters from at least one of multiple base stations to which the multiple link connections are connected; maintaining, at the user equipment, multiple groups of power headroom report timers respectively corresponding to the multiple link connections and maintaining multiple groups of triggering conditions for reporting power headroom respectively corresponding to the multiple link connections, wherein a number of groups of the multiple groups of the power headroom report timers and the number of groups of (Continued)

the multiple groups of triggering conditions for reporting the power headroom are identical to the number of connections of the multiple link connections respectively; if at least one triggering condition of one group of the triggering conditions for reporting the power headroom is met with respect to a corresponding base station of the multiple base stations, then calculating the power headroom for the corresponding base station and generating a power headroom report; and sending the power headroom report to the corresponding base station.

15 Claims, 4 Drawing Sheets

(56) References Cited

U.S. PATENT DOCUMENTS

| | | | | |
|---|---|---|---|---|
| 2012/0263060 | A1* | 10/2012 | Suzuki | H04W 52/365 370/252 |
| 2013/0064131 | A1* | 3/2013 | Kwon | H04L 5/0007 370/252 |
| 2013/0070716 | A1* | 3/2013 | Kwon | H04L 5/0007 370/329 |
| 2013/0188563 | A1 | 7/2013 | Kim et al. | |
| 2015/0382312 | A1* | 12/2015 | Kim | H04W 52/365 370/252 |

FOREIGN PATENT DOCUMENTS

| | | |
|---|---|---|
| WO | WO 2012/119626 A1 | 9/2012 |
| WO | WO 2013/025562 A2 | 2/2013 |

OTHER PUBLICATIONS

"3$^{rd}$ Generation Partnership Project; Technical Specification Group Radio Access Network; Evolved Universal Terrestrial Radio Access (E-UTRA); Medium Access Control (MAC) protocol specification (Release 11)," 3GPP TS 36.321 V11.2.0, pp. 1-56, XP050692243, (Mar. 2013).

International Search Report for PCT/IB2014/000796 dated Sep. 17, 2014.

\* cited by examiner

METHOD AND APPARATUS FOR REPORTING POWER HEADROOM IN SUPPORT OF MULTIPLE LINK CONNECTIONS

TECHNICAL FIELD

Various embodiments of the present invention generally relate to a wireless communications system, and more particularly to a method and apparatus for reporting power headroom in support of multiple link connections for use in the wireless communications system.

BACKGROUND

In view of the advantages of capacity improvement and coverage of blind-spots brought by low-power nodes, there is a big interest in deployment and enhancement of small cells in LTE/LTE-A (LTE-Advanced). In 3GPP R12, a new research project, "Small Cell Enhancements for E-UTRA and E-UTRAN-higher-layer aspects", has been approved and the important significance of it lies in supporting multiple link connections to macro cells and small cells. If there are multiple link connections established for one user equipment (UE), such as a first connection established to a macro cell and a second connection established to a pico cell which is a typical small cell, then this UE can avoid frequent switching among pico cells which are deployed in high density, via the first connection to the macro cell, and meanwhile obtain a throughout gain via the second connection to the pico cell.

As well known, a base station has a crucial function for scheduling to allocate resources to users so as to achieve desired QoS and system capacity. Power Headroom Report (PHR) is one important input for uplink scheduling. The importance of the power headroom report in an uplink system is to provide a base station (e.g. eNB) with some important information required for scheduling uplink resources, that is power information on the UE side. In the existing systems, generally there is only one serving base station for one user, therefore the user only needs to send to one base station the power headroom report of every active cell. However, if two or more link connections need to be supported, the user needs two or more serving base stations and two or more independent schedulers (in the case that two or more base stations are linked through a non-ideal backhaul), thus the user needs to report power headroom to two or more base stations.

In the existing systems, since there is only one serving node or base station (although with carrier aggregation (CA), there are multiple serving cells, these cells are co-located physically), power headroom reporting is relatively simple for the following reasons, e.g.:

only one serving node or base station needs to obtain the power headroom to schedule resources;

since only one group of triggering conditions need to be maintained for one link, even in the case with CA, only one group of triggering conditions need to be maintained during the power headroom reporting; and since the physical uplink link control channel is transmitted only on the primary carrier or primary cell (PCell), only one power headroom report of type 2 is needed.

However in the case of enhanced small cells, i.e. in the case of requiring support of multiple link connections, some new problems on the power headroom reporting arise and need to be solved, e.g.:

Due to the presence of two or more serving base stations (for example, a macro cell base station and a small cell base station), a user needs to report power headroom to these two or more base stations, respectively. In a single carrier system, the user needs to obtain two pathloss values respectively for the carriers configured for the macro cell base station and the small cell base station and to perform a power control so as to obtain transmitting power, and to calculate the power headroom respectively for the two carriers of the two base stations. In the case of multi-carrier aggregation, each base station is configured with multiple carriers. The user needs to obtain different transmitting power on different carriers of different base stations and calculate based on them the power headroom for each carrier of each base station. Thus, when the user needs to send power headroom reports to more than one base station simultaneously, it is necessary to solve such problems as what value is to be reported to each base station and how to report it.

Therefore, the existing power headroom reporting mechanism cannot support two or more link connections. There is a need for a novel power headroom reporting mechanism taking into consideration new characteristics of dual/multiple link connections

SUMMARY

In view of the above problems, embodiments of the present invention provide a method and apparatus for reporting power headroom in support of multiple link connections.

According to one aspect of the present invention, there is provided a method for reporting power headroom in support of multiple link connections, comprising: receiving, by a user equipment, one or more configured power headroom report parameters from at least one of multiple base stations to which the multiple link connections are connected; maintaining, at the user equipment, multiple groups of power headroom report timers corresponding to the multiple link connections respectively and maintaining multiple groups of triggering conditions for reporting power headroom corresponding to the multiple link connections respectively, wherein a number of groups of the multiple groups of the power headroom report timers and the number of groups of the multiple groups of triggering conditions for reporting power headroom are identical to the number of connections of the multiple link connections respectively; if at least one triggering condition of one group of the triggering conditions for reporting power headroom is met with respect to a corresponding base station of the multiple base stations, then calculating the power headroom for the corresponding base station and generating a power headroom report; and sending the power headroom report to the corresponding base station.

According to another aspect of the present invention, there is provided a method for reporting power headroom in support of multiple link connections, comprising: configuring, by a base station, multiple groups of power headroom report parameters corresponding to the multiple link connections, with a number of groups of the multiple groups of power headroom report parameters being identical to the number of connections of the multiple link connections; sending to a user equipment the configured multiple groups of the power headroom report parameters; and receiving from the user equipment the power headroom report that the user equipment generates for the base station.

According to yet another aspect of the present invention, there is provided an apparatus for reporting power headroom in support of multiple link connections, comprising: a receiver that is configured to receive one or more configured power headroom report parameters from at least one of multiple base stations to which the multiple link connections are connected; a memory that is configured to at least store the one or more received power headroom report parameters; and a processor that is configured to maintain multiple groups of power headroom report timers corresponding to the multiple link connections respectively and maintain multiple groups of triggering conditions for reporting power headroom corresponding to the multiple link connections respectively, wherein a number of groups of the multiple groups of the power headroom report timers and the number of groups of the multiple groups of triggering conditions for reporting power headroom are identical to the number of connections of the multiple link connections, and further configured to, when at least one of one group of the triggering conditions for reporting power headroom is met with respect to a corresponding base station of the multiple base stations, calculate the power headroom for the corresponding base station and generate a power headroom report; and a transmitter that is configured to send the power headroom report to the corresponding base station.

According to yet another aspect of the present invention, there is provided an apparatus for reporting power headroom in support of multiple link connections, comprising: a processor that is configured to configure multiple groups of power headroom report parameters corresponding to the multiple link connections, with a number of groups of the multiple groups of power headroom report parameters being identical to the number of connections of the multiple link connections; a transmitter that is configured to send to a user equipment the configured multiple groups of power headroom report parameters; a receiver that is configured to receive from the user equipment the power headroom report that the user equipment generates for the base station; and a memory that is configured to store the configured multiple groups of power headroom report parameters and the received power headroom report.

BRIEF DESCRIPTION OF THE DRAWINGS

In conjunction with the drawings and referring to the following description, features, advantages and other aspects of various embodiments of the present invention will become more apparent and several embodiments of the present invention will be given herein by an exemplary and non-limiting way. In the drawings.

DETAILED DESCRIPTION

Various exemplary embodiments of the present invention are described in the following with reference to the drawings.

It should be understood that these exemplary embodiments are only intended to make the present invention better understood and further embodied by one skilled in the art, rather than limit the protection scope of the present invention in any way.

A mechanism for reporting power headroom in support of two link or more link connections according to embodiments of the present invention needs to meet the following rules: (1) an UE shall respectively maintain two or more independent power headroom reporting procedures for two or more base stations to which the two link or more link connections are connected; (2) transmissions of power headroom reports for different cell base stations (for example, a macro cell base station and a small cell base station) are triggered independently; (3) the power headroom reporting is controlled by configuring two or more groups of power headroom report parameters, e.g. in the case of dual link connections, by configuring one or two periodic PHR timer (i.e. periodic PHR-Timer) values for the macro cell base station and the small cell base station and one or more prohibit PHR timer (i.e. prohibitPHR-Timer) values using RRC messages, and configuring one or two downlink pathloss change thresholds (i.e. dl-PathlossChange) for the macro cell base station and the small cell base station; (4) the user needs to, as for said two link or more link connections, maintain two or more groups of periodic PHR-Timers and prohibit PHR-Timers respectively and maintain two or more groups of triggering conditions for triggering transmissions of the power headroom reports respectively; (5) the physical layer of the UE obtains corresponding power headroom on each configured carrier of each base station respectively based on transmitting power, and the user obtains from the physical layer these power headroom values and the maximum transmitting power PCMAX,c on a corresponding carrier; and (6) the UE reports only the power headroom on the carrier configured for the corresponding cell.

Hereinafter, the mechanism for reporting power headroom in support of dual link connections will be described in more detail in conjunction with the drawings. Although the method of the present invention is described with the example of the dual link connections, one skilled in the art shall understand that the present invention is not limited to the dual link connections, but can be extended to support a wireless communications system of more than two link connections, for example, by at least configuring a number of groups of PHR parameters, a number of groups of the PHR timers, a number of groups of the PHR triggering conditions and the like.

Figure 1:
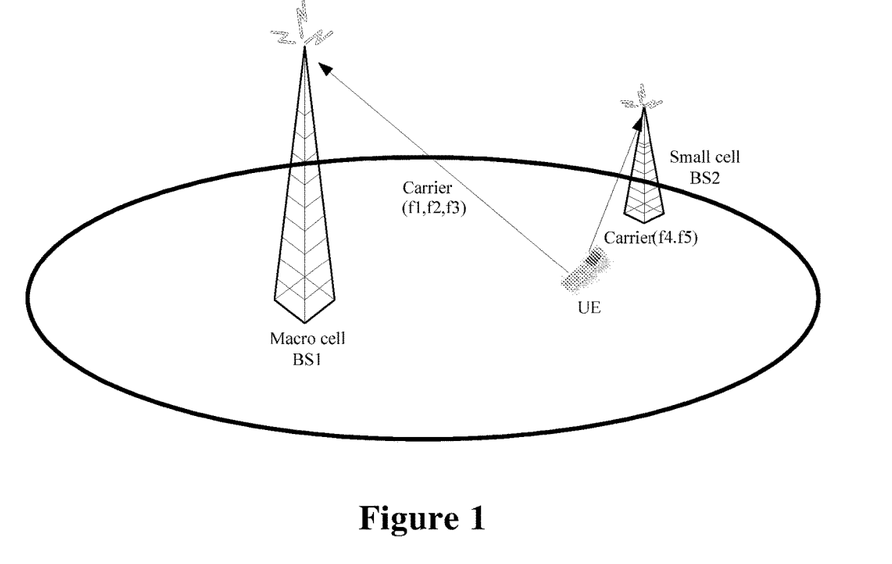
FIG. 1 illustrates an exemplary environment where a method for reporting power headroom according to an embodiment of the present invention is applied, wherein a user equipment UE is served simultaneously by a macro cell base station BS1 and a small cell base station BS2 which are respectively configured with multiple different carriers.

FIG. 1 illustrates an exemplary environment where a method for reporting power headroom according to an embodiment of the present invention is applied, wherein a user equipment UE is served simultaneously by a macro cell base station BS1 and a small cell base station BS2 which are respectively configured with multiple different carriers. As shown in FIG. 1, the macro cell base station BS1 is configured with three carriers (f1, f2 and f3) and the small cell base station BS2 is configured with two carriers (f4 and f5).

In order to support dual link connections, based on the above specified rules (1) to (6), a user may report power headroom on each activated cell to the base station to which that carrier is configured, for example, the user may report the power headroom on the activated carriers f1, f2 and f3 to the macro cell base station BS1 and report the power headroom on the activated carriers f4 and f5 to the small cell base station BS2.

The power headroom reporting for different base stations (for example, the macro cell base station and the small cell base station) may be triggered independently. The triggering conditions for triggering the power headroom reporting in the existing system which only supports a single link connection may be used in the wireless communications system supporting dual link connections (such as E-UTRAN). For example, these triggering conditions comprise:

(1) the prohibitPHR-Timer expires or has expired, and for at least one activated serving cell, amount of change in the downlink pathloss since the last power headroom report was sent exceeds the downlink pathloss change threshold dl-PathlossChange dB;

(2) the periodicPHR-Timer expires;

(3) Upper layers of the UE configure or reconfigure a function for reporting power headroom; and (4) a secondary cell (SCell) of the configured uplink is activated.

Hereinafter, it will be described how the above triggering conditions (1) to (4) of the power headroom reporting are applied to the mechanism for reporting power headroom according to embodiments of the present invention in the environment as shown in FIG. 1.

In order to support the dual link connections to the macro cell base station and the small cell base station, as for the first triggering condition (1), a user may maintain, at the UE, two prohibitPHR-Timer timers (one for the macro cell base station and the other for the small cell base station). If the prohibitPHR-Timer timer for the macro cell base station expires and the amount of change in the pathloss since the last PHR transmission was transmitted exceeds the configured downlink pathloss reference threshold (dl-Pathloss-Change), power headroom is calculated for the macro cell base station and a power headroom report is generated. Moreover, the power headroom on individual carriers configured in the macro cell base station may be reported to the macro cell base station by forming a MAC CE (Media Access Control control element) for transmitting the power headroom report. Similarly, if the prohibitPHR-Timer timer for the small cell base station expires and the amount of change in pathloss since the last PHR transmission was transmitted exceeds the configured downlink pathloss reference threshold, power headroom is calculated for the small cell base station and a power headroom report is generated. Moreover, the power headroom on individual carriers configured in the small cell base station may be reported to the small cell base station by the MAC CE.

Similarly, as for the second triggering condition (2), the user may maintain two periodicPHR-Timer timers (one for the macro cell base station and the other for the small cell base station). If the periodicPHR-Timer timer for the macro cell base station expires, power headroom is calculated for the macro cell base station and a power headroom report is generated. Moreover, the power headroom on individual carriers configured in the macro cell base station may be reported to the macro cell base station by the MAC CE; if the periodicPHR-Timer timer for the small cell base station expires, power headroom is calculated for the small cell base station and a power headroom report is generated. Moreover, the power headroom on individual carriers configured in the small cell base station may be reported to the small cell base station by the MAC CE.

As for the third triggering condition (3), when upper layers of the UE configure or reconfigure the function for reporting power headroom, for example, if the macro cell base station configures or reconfigures the function for reporting power headroom, then it would trigger the transmission of the power headroom report for the macro cell base station; if the small cell base station configures or reconfigures the function for reporting power headroom, then it would trigger the transmission of the power headroom report for the small cell base station; and if both the macro cell base station and the small cell base station configure and reconfigure the function for reporting power headroom, then it would trigger the transmissions of the power headroom reports for these two cell base stations, respectively.

As for the last triggering condition (4), when one secondary carrier or secondary cell (SCell) in the uplink configured for one base station is activated, the transmission of the power headroom report for this base station is triggered. For example, if one secondary carrier is activated on the uplink for the macro cell base station, the power headroom report is sent to the macro cell base station; and if one secondary carrier is activated on the uplink for the small cell base station, the power headroom report is sent to the small cell base station.

In the wireless communications system supporting dual/multi link connections, in the case of linking via a non-ideal backhaul, the macro cell and the small cell are independently scheduled, wherein PUCCHs shall be supported in both the macro cell and the small cell. Thus, in the case of multiple carriers, for each cell of these two cells, there is one primary carrier or primary cell (PCell) to support the PUCCH, thus it is necessary to configure extended PHR. For example, f1 may be configured as the Pcell for a user in the macro cell and f4 may be configured as the Pcell for the user in the small cell. If simultaneousPUCCH-PUSCH is configured, then a type-2 PHR for the PCell (f1) will be transmitted to the macro cell base station and the type-2 PHR for the PCell (f4) will be transmitted to the small cell base station.

Figure 2:
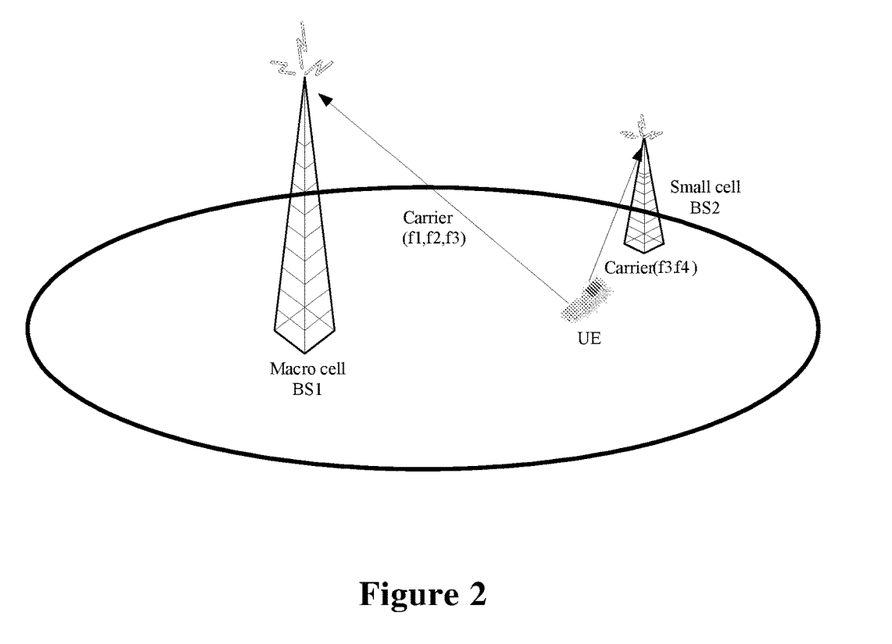
FIG. 2 illustrates an exemplary environment where a method for reporting power headroom according to an embodiment of the present invention is applied, wherein a user equipment UE is served simultaneously by a macro cell base station BS1 and a small cell base station BS2 which are configured with at least one same carrier.

FIG. 2 illustrates an exemplary environment where a method for reporting power headroom according to an embodiment of the present invention is applied, wherein a user equipment UE is served simultaneously by a macro cell base station BS1 and a small cell base station BS2 which are configured with at least one same carrier. As shown in FIG. 2, the macro cell base station BS1 is configured with three carriers (f1, f2 and f3) and the small cell base station BS2 is configured with two carriers (f3 and f4). The macro cell base station and the small cell station are configured with one same carrier f3.

The method for reporting power headroom according to the embodiments of the present invention has substantially the same operations in the environment as shown in FIG. 2 and in that as shown in FIG. 1, except for the followings to be discussed. That is, in the environment as shown in FIG. 2, when a UE needs to report the power headroom on each activated carrier to the corresponding cell configured with these carriers, for example, when the UE needs to report the power headroom on carriers f1, f2 and f3 to the macro cell base station BS1 and to report the power headroom on carriers f3 and f4 to the small cell base station BS2, since the base stations BS1 and BS2 are both configured with the same carrier f3, it is required to firstly distinguish the transmitting power on the carrier 3 configured for the macro cell base station BS1 and the transmitting power on the carrier 3 configured for the small cell base station BS2 and calculate the power headroom on the carrier 3 respectively for the base stations BS1 and BS2, before sending the power headroom reports to the macro cell base station BS1 and the small cell base station BS2. Generally speaking, the pathloss from the UE to the macro cell base station is different from the pathloss from the UE to the small cell base station, which may result in different transmitting power for the macro cell station and the small cell station, therefore even with the same carriers 3, as for the macro cell base station and the small cell base station, the power headroom values on the carriers 3 are different normally.

Methods for reporting power headroom in support of multiple link connections according to embodiments of the present invention will be described in detail referring to FIGS. 3 and 4.

Figure 3:
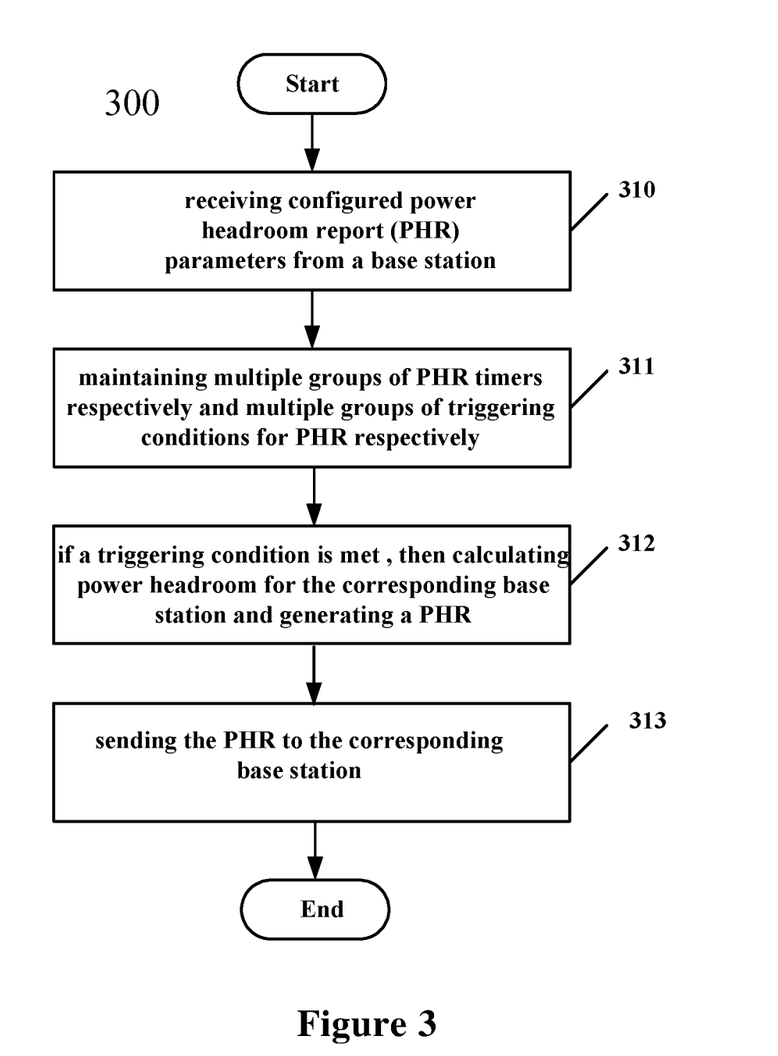
FIG. 3 shows a flowchart of a method 300 for reporting power headroom in support of multiple link connections according to an embodiment of the present invention, which is performed at a user equipment.

FIG. 3 shows a flowchart of a method 300 for reporting power headroom in support of multiple link connections according to an embodiment of the present invention, which is performed at a UE.

As shown in FIG. 3, in Block 310, the UE receives one or more configured power headroom report parameters from at least one of multiple base stations to which the multiple link connections are connected. According to one embodiment of the present invention, the one or more power headroom report parameters at least comprise one of a periodic PHR timer value, a prohibit PHR timer value and a downlink pathloss change threshold. In Block 311, the UE maintains multiple groups of PHR timers corresponding to the multiple link connections respectively and maintains multiple groups of triggering conditions for reporting power headroom corresponding to the multiple link connections respectively, wherein the number of groups of the multiple groups of the PHR timers and the number of groups of the multiple groups of triggering conditions for reporting power headroom are identical to the number of connections of the multiple link connections respectively. According to an embodiment of the present invention, each group of the multiple groups of triggering conditions maintained by the UE at least comprises one of the following: the maintained periodic PHR timer expires; the maintained prohibit PHR timer expires or has expired, and the amount of change in the downlink pathloss since the last power headroom report was sent exceeds the configured downlink pathloss change threshold value; at least one base station configures or reconfigures the function for reporting power headroom; and a secondary cell is activated. Sequentially, in Block 312, if at least one of one group of the multiple groups of triggering conditions for reporting power headroom is met with respect to a corresponding base station of the multiple base stations to which the multiple link connections are connected, then the power headroom is calculated for the corresponding base station and a power headroom report is generated. According to an embodiment of the present invention, calculating the power headroom for the corresponding base station comprises calculating the power headroom for each activated carrier of the one or more carriers configured for the corresponding base station. According to another embodiment of the present invention, when calculating the power headroom, for two or more base stations with a same carrier of the multiple base stations to which the multiple link connections are connected, the power headroom on the same carrier are determined respectively. Finally, in Block 313, the UE sends the generated power headroom report to the corresponding base station. According to an embodiment of the present invention, the UE may form a MAC CE for transmitting the power headroom report, and send the power headroom report to the corresponding base station through the MAC CE.

Figure 4:
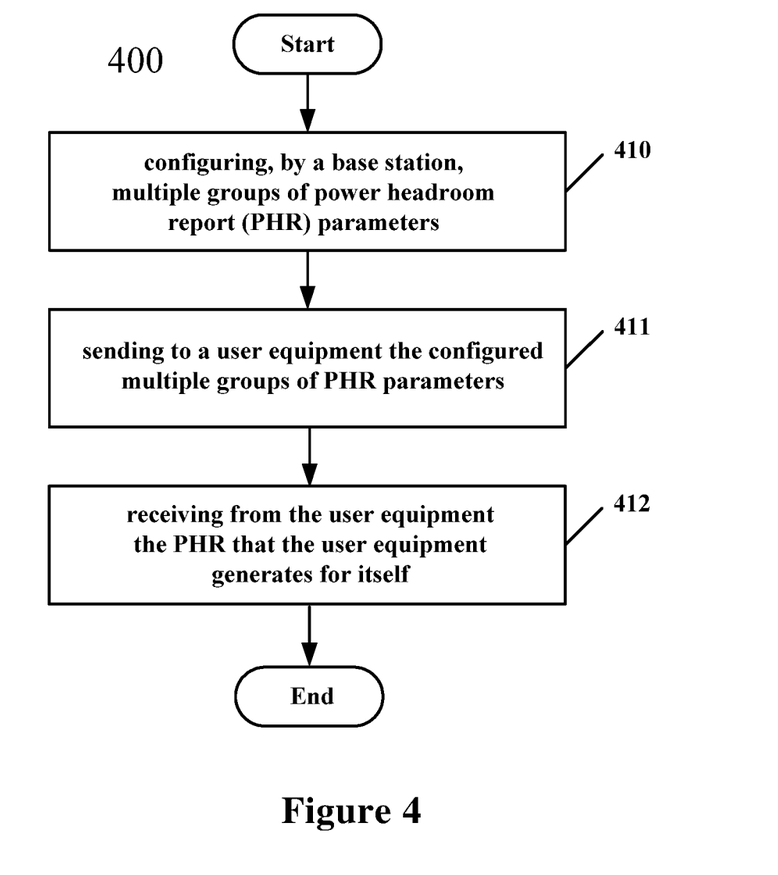
FIG. 4 shows a flowchart of a method 400 for reporting power headroom in support of multiple link connections according to an embodiment of the present invention, which is performed at a base station.

FIG. 4 shows a flowchart of a method 400 for reporting power headroom in support of multiple link connections according to an embodiment of the present invention, which is performed at a base station.

As shown in FIG. 4, in Block 410, the base station configures multiple groups of power headroom report parameters corresponding to the multiple link connections, wherein the number of groups of the multiple groups of the power headroom report parameters is identical to the number of connections of the multiple link connections. According to an embodiment of the present invention, each group of the multiple groups of the power headroom report parameters at least comprises one of a periodic PHR timer value, a prohibit PHR timer value and downlink pathloss change threshold. Afterwards, in Block 411, the base station sends the configured multiple groups of the power headroom parameters to the UE. Finally, in Block 412, the base station receives from the UE the power headroom report obtained for that base station.

An apparatus for reporting power headroom in support of multiple link connections according to an embodiment of the present invention will be described in detail with reference to FIG. 5.

Figure 5:
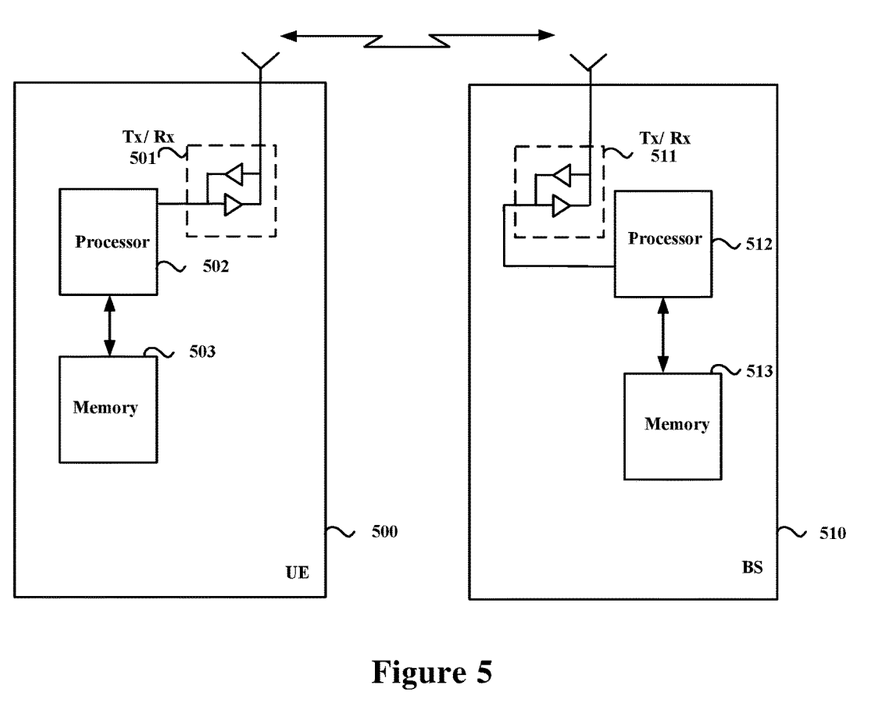
FIG. 5 shows a block diagram of an apparatus 500 at user equipment side and an apparatus 510 at base station side for reporting power headroom in support of multiple link connections according to an embodiment of the present invention.

FIG. 5 shows a block diagram of an apparatus 500 at UE side and an apparatus 510 at base station side for reporting power headroom in support of multiple link connections according to embodiments of the present invention.

As shown in FIG. 5, the apparatus 500 at UE side at least comprises: a transmitter/receiver 501, which is configured to send to the base station a power headroom report and receive from the base station 510 the configured power headroom report parameters; a processor 502, which is configured to enable the apparatus 500 to perform the method 300 according to the embodiments of the present invention, for example, the processor may be used to maintain multiple groups of PHR timers corresponding to the multiple link connections respectively and to maintain multiple groups of triggering conditions for reporting power headroom corresponding to the multiple link connections respectively, and in the case that at least one of one group of the multiple groups of triggering conditions for reporting power headroom is met with respect to a corresponding base station of the multiple base stations to which the multiple link connections are connected, then the processor is configured to calculate power headroom for the corresponding base station and generate a power headroom report; and a memory 502, which is configured to store the received power headroom report parameters and to store program instructions and data required for performing the method 300 according to the embodiments of the present invention.

As shown in FIG. 5, the apparatus 510 at base station side at least comprises: a transmitter/receiver 511, which is configured to send to the UE the power headroom report parameters and receive from the UE the reported power headroom report; a processor 512, which is configured to enable the apparatus 510 to perform the method 400 according to the embodiments of the present invention, for example, the processor may be used to configure multiple groups of power headroom report parameters corresponding to the multiple link connections; and a memory 512, which is configured to store the received power headroom report and the configured power headroom report parameters and to store program instructions and data required for performing the method 400 according to the embodiments of the present invention In the above, the description is made, by way of example, with the LTE-A system supporting dual link connections, however one skilled in the art will understand that the method of the present invention is not limited to the LET-A system and a more advanced system thereof, and it is also suitable for other wireless communications systems supporting dual link connections and wireless communications systems supporting more link connections which will possibly be standardized or appear in the future.

The above descriptions made referring to the drawings are given only for illustrating the present invention. One skilled in the art shall understand that different method steps or apparatus structures may be proposed based on the principles of the present invention described above. Although these different method steps or apparatus structures are not described or illustrated herein explicitly, they reflect the principles of the present invention and are covered by the spirit and scope of the present invention. In addition, all examples are given herein for the purpose of teaching, to help readers understand the principles of the present invention and concepts that the inventor contributes to facilitate development of the technologies of the art, and should not be understood as limiting the scope of the present invention. Moreover, the descriptions and particular examples of the principles, aspects and embodiments of the present invention mentioned herein comprise the equivalents of the present invention.

The invention claimed is:

1. A method for reporting power headroom in support of multiple link connections, comprising:
   receiving, by a user equipment, one or more configured power headroom report parameters from at least one of multiple base stations to which the multiple link connections are connected;
   maintaining, at the user equipment, multiple groups of power headroom report timers corresponding to the multiple link connections respectively and maintaining multiple groups of triggering conditions for reporting power headroom corresponding to the multiple link connections respectively, wherein a number of groups of the multiple groups of the power headroom report timers and the number of groups of the multiple groups of triggering conditions for reporting power headroom are identical to the number of connections of the multiple link connections respectively;
   if at least one triggering condition of one group of the triggering conditions for reporting power headroom is met with respect to a corresponding base station of the multiple base stations, then calculating the power headroom for the corresponding base station and generating a power headroom report; and
   sending the power headroom report to the corresponding base station.

2. The method according to claim 1, wherein the one or more power headroom report parameters at least comprise one of: a periodic power headroom report timer value, a prohibit power headroom report timer value and a downlink pathloss change threshold.

3. The method according to claim 1, wherein each group of the multiple groups of power headroom report timers at least comprises one of: a periodic power headroom report timer and a prohibit power headroom report timer.

4. The method according to claim 3, wherein each group of the multiple groups of the triggering conditions for reporting power headroom at least comprises one of:
   the periodic power headroom report timer expires;
   the prohibit power headroom report timer expires or has expired, and amount of change in downlink pathloss since the last power headroom report was sent exceeds the downlink pathloss change threshold;
   the at least one base station configures or reconfigures a function for reporting power headroom; and
   a secondary cell is activated.

5. The method according to claim 1, wherein calculating the power headroom for the corresponding base station comprises calculating the power headroom for each activated carrier of the corresponding base station.

6. The method according to claim 1, wherein if any two or more base stations of the multiple base stations are configured with at least one same carrier, then the method further comprises:
   determining the power headroom on the at least one same carrier for the two or more base stations respectively when calculating the power headroom.

7. A method for reporting power headroom in support of multiple link connections, comprising:
   configuring, by a base station, multiple groups of power headroom report parameters corresponding to the multiple link connections, with a number of groups of the multiple groups of power headroom report parameters being identical to the number of connections of the multiple link connections;
   sending to a user equipment the configured multiple groups of the power headroom report parameters; and
   receiving from the user equipment a power headroom report that the user equipment generates for the base station.

8. The method according to claim 7, wherein each group of the multiple groups of the power headroom report parameters at least comprises one of: a periodic power headroom report timer value, a prohibit power headroom report timer value and a downlink pathloss change threshold.

9. An apparatus for reporting power headroom in support of multiple link connections, comprising:
   a receiver that is configured to receive one or more configured power headroom report parameters from at least one of multiple base stations to which the multiple link connections are connected;
   a memory that is configured to at least store one or more received power headroom report parameters; and
   a processor that is configured to maintain multiple groups of power headroom report timers corresponding to the multiple link connections respectively and to maintain multiple groups of triggering conditions for reporting power headroom corresponding to the multiple link connections respectively, wherein a number of groups of the multiple groups of the power headroom report timers and the number of groups of the multiple groups of triggering conditions for reporting power headroom are identical to the number of connections of the multiple link connections; and further configured to, when at least one of one group of the triggering conditions for reporting power headroom is met with respect to a corresponding base station of the multiple base stations, calculate the power headroom for the corresponding base station and generate a power headroom report; and
   a transmitter that is configured to send the power headroom report to the corresponding base station.

10. The apparatus according to claim 9, wherein the one or more power headroom report parameters at least comprise one of: a periodic power headroom report timer value, a prohibit power headroom report timer value and a downlink pathloss change threshold.

11. The apparatus according to claim 10, wherein each group of the multiple groups of power headroom report timers at least comprises one of: a periodic power headroom report timer and a prohibit power headroom report timer.

12. The apparatus according to claim 11, wherein each group of the multiple groups of the triggering conditions for reporting power headroom at least comprises one of:
   the periodic power headroom report timer expires;
   the prohibit power headroom report timer expires or has expired, and amount of change in downlink pathloss since the last power headroom report was sent exceeds the downlink pathloss change threshold;
   the at least one base station configures or reconfigures a function for reporting the power headroom; and
   a secondary cell is activated.

13. The apparatus according to claim 9, wherein the processor is further configured to generate the power headroom report for each activated carrier of the corresponding base station.

14. The apparatus according to claim 9, wherein if any two or more base stations of the multiple base stations are configured with at least one same carrier, then the processor is further configured to:
   calculate the power headroom on the at least one same carrier for the two or more base stations respectively when calculating the power headroom.

15. An apparatus for reporting power headroom in support of multiple link connections, comprising:
   a processor that is configured to configure multiple groups of power headroom report parameters corresponding to the multiple link connections, with a number of groups of the multiple groups of power headroom report parameters being identical to the number of connections of the multiple link connections;
   a transmitter that is configured to send to a user equipment the configured multiple groups of power headroom report parameters;
   a receiver that is configured to receive from the user equipment the power headroom report that the user equipment generates for the base station; and
   a memory that is configured to store the configured multiple groups of power headroom report parameters and the received power headroom report.

* * * * *